(12) United States Patent
Eller et al.

(10) Patent No.: US 8,887,494 B2
(45) Date of Patent: Nov. 18, 2014

(54) SYSTEM FOR INTRODUCING FUELS INTO THE EXHAUST TRACT OF A MOTOR VEHICLE, AND FUEL VAPORIZER FOR THE SAME

(75) Inventors: Martin Eller, Ludwigsburg (DE); Volker Brichzin, Ludwigsburg (DE); Christian Friedrich, Landau (DE); Tobias Inclán, Wissembourg (FR)

(73) Assignee: Tenneco GmbH, Edenkoben (DE)

( * ) Notice: Subject to any disclaimer, the term of this patent is extended or adjusted under 35 U.S.C. 154(b) by 714 days.

(21) Appl. No.: 13/258,249

(22) PCT Filed: Mar. 11, 2010

(86) PCT No.: PCT/EP2010/001542
§ 371 (c)(1),
(2), (4) Date: Jan. 16, 2012

(87) PCT Pub. No.: WO2010/108604
PCT Pub. Date: Sep. 30, 2010

(65) Prior Publication Data
US 2012/0117955 A1      May 17, 2012

(30) Foreign Application Priority Data

Mar. 23, 2009    (DE) .................. 10 2009 013 664

(51) Int. Cl.
| | |
|---|---|
| F01N 3/10 | (2006.01) |
| F01N 3/025 | (2006.01) |
| F01N 3/36 | (2006.01) |
| F01N 13/18 | (2010.01) |
| F01N 3/20 | (2006.01) |

(52) U.S. Cl.
CPC ............... *F01N 3/0253* (2013.01); *F01N 3/36* (2013.01); *F01N 13/18* (2013.01); *F01N 3/206* (2013.01); *F01N 2610/03* (2013.01); *F01N 2610/10* (2013.01); *F01N 2610/1453* (2013.01)
USPC .......................................................... 60/303

(58) Field of Classification Search
CPC ......... F01N 3/0253; F01N 3/36; F01N 13/18; F01N 3/206
USPC .................... 60/274, 303; 261/141
See application file for complete search history.

(56) References Cited

U.S. PATENT DOCUMENTS

| | | | |
|---|---|---|---|
| 5,884,475 A | 3/1999 | Hofmann et al. | |
| 2008/0148716 A1* | 6/2008 | Nishibu et al. | 60/295 |

(Continued)

FOREIGN PATENT DOCUMENTS

| | | |
|---|---|---|
| DE | 43 08 543 A1 | 9/1994 |
| DE | 10 2005 034 888 A1 | 2/2007 |

(Continued)

*Primary Examiner* — Thomas Denion
*Assistant Examiner* — Jason Shanske
(74) *Attorney, Agent, or Firm* — Hackler Daghighian & Martino

(57) ABSTRACT

The invention relates to a system for introducing fuel into the exhaust line of a motor vehicle, having a fuel evaporator with a housing, which has an inlet and an outlet, and a heating device arranged in the housing, and a pump for pumping fuel into the fuel evaporator via the inlet. Provision is made for an inlet of the pump to be connected to a branching, which encompasses a first branch for supplying fuel and a second branch for supplying air. The invention further relates to a fuel evaporator for such a system.

17 Claims, 4 Drawing Sheets

(56) References Cited

U.S. PATENT DOCUMENTS

2008/0282681 A1* 11/2008 Katou et al. .................. 60/286
2009/0101656 A1* 4/2009 Leonard ...................... 220/562
2009/0301070 A1 12/2009 Klement

FOREIGN PATENT DOCUMENTS

DE 10 2006 032 399 A1 1/2008
FR 2 920 836 A1 3/2009

* cited by examiner

SYSTEM FOR INTRODUCING FUELS INTO THE EXHAUST TRACT OF A MOTOR VEHICLE, AND FUEL VAPORIZER FOR THE SAME

The invention relates to a system for introducing fuel into the exhaust line of a motor vehicle. Modern engines combust increasingly leaner fuel mixtures, thus resulting in relatively high oxygen concentrations and nitrogen oxide concentrations in the exhaust gas. Such exhaust gases can be cleaned by means of modern vehicle catalysts, for example NOx-storage catalysts, wherein a reducing atmosphere must be generated in regular intervals for reducing the nitrogen oxides. The simplest way of attaining this is by introducing a small amount of fuel into the exhaust line, when required.

It is an object of the invention to present an approach on how to be able to lower the costs of the exhaust gas treatment in motor vehicles.

SUMMARY OF THE INVENTION

A system according to the invention has a fuel evaporator, which has a housing comprising an inlet and an outlet, as well as a heating device arranged in the housing, and a pump for pumping fuel into the fuel evaporator via the inlet. Even though the evaporation of fuel advantageously provides for a good distribution of fuel in the exhaust line, but the danger of a carbonization or sooting does exist in the evaporator. Oil carbon in the evaporator can hinder or even block the fuel supply, so that the fuel evaporator breaks down prematurely.

By connecting an inlet of the pump to a branching, which encompasses a first branch for supplying fuel and a second branch for supplying air, the fuel evaporator can be regenerated by supplying air in the case of a system according to the invention. That is to say that oil carbon can be combusted in the fuel evaporator by means of introducing air. In the case of a system according to the invention, the supply of fresh air is advantageously attained by means of the pump, which is already available for pumping fuel, so that the additional effort of a system according to the invention is minimal. Surprisingly, the same pump can be used for pumping liquid fuel as well as for pumping air, without being destroyed by dryout. That is to say that the pump is always used only briefly for pumping air, typically for 0.5 to 2 minutes in the case of a system according to the invention, and fuel subsequently flows through it again, and it is thus lubricated again.

The two branches of a system according to the invention can in each case be capable of being locked by means of a separate valve, for example, wherein the valves are switched as required by a central control unit, so as to introduce either air or fuel into the fuel evaporator. Preferably, however, the branching is a control valve, in particular a 2-port/1-way valve, by means of which either the first branch or the second branch can be locked. In so doing, a system according to the invention can be realized with a particularly small effort. In the simplest case, it is sufficient to install a control valve into the supply line of the pump. Depending on the switching status of the control valve, the pump is then either connected to a fuel supply line or to the ambient air via the other connection of the control valve.

A fuel evaporator according to the invention has a housing comprising an inlet and an outlet as well as a heating device arranged in the housing. The housing is a multi-part housing, wherein a main housing part surrounds the heating device, which is embodied in a rod-shaped manner and which is joined with a housing end piece, which encompasses the outlet. A multi-part housing design has the advantage that the outlet can be given a shape, which is advantageous for the distribution of the fuel in the exhaust line, for example a nozzle or diffuser shape, and that, on the other hand, the production can be simplified, because the introduction of the heating device into a main housing part and a subsequent joining of the housing parts is possible very easily, for example in that the main housing part is fitted together with the housing end piece, in particular in that the housing end piece is inserted into the main housing part. The insertion can be carried out easily in response to the production and advantageously leads to overlapping surfaces of the two housing parts, which can be used for a connection by material engagement, for example by means of welding or by means of soldering.

An advantageous development of the invention provides for the heating device to project into the housing end piece. It is indeed also possible for the heating device to end in the main housing part. However, an improved heat coupling of the fuel and thus also an improved evaporation results in the event that the heating device projects into the housing end piece.

Preferably, the heating device is surrounded by a screen, for example by a metal fabric. In so doing, the heat coupling of the fuel to the heating device can be improved.

An advantageous development of the invention provides for the heating device in the housing to be surrounded by at least one bushing, which provides a flow path comprising two sections, which are arranged downstream from one another in flow direction, wherein one of the two section leads along the interior of the bushing and the other section leads along the exterior of the bushing. This can be attained, for example, in that the bushing is fastened to the housing or to the heating device on one end only, while fuel can circulate around the other end of the bushing. In so doing, an extended flow path and thus an enlarged evaporator section can be generated. Preferably, the tubular heating device in the housing is surrounded by two or even more bushings, wherein one of the bushings is fastened to the housing with one end and another bushing is fastened to the heating device with the opposite end. The two bushings can engage with one another and can embody a section of the flow path between one another. In so doing, it is possible to provide a meandering flow path and thus an advantageously large evaporator section. Furthermore, a long evaporator section has the advantage that the vapor pressure of evaporated fuel can be used to eject unevaporated fuel residues, which may be present.

BRIEF DESCRIPTION OF THE DRAWINGS

Further details and advantages of the invention are defined by means of exemplary embodiments with reference to the enclosed drawings. Parts which are the same and which correspond to one another are thereby provided with corresponding reference numerals.

DETAILED DESCRIPTION

Figure 1:
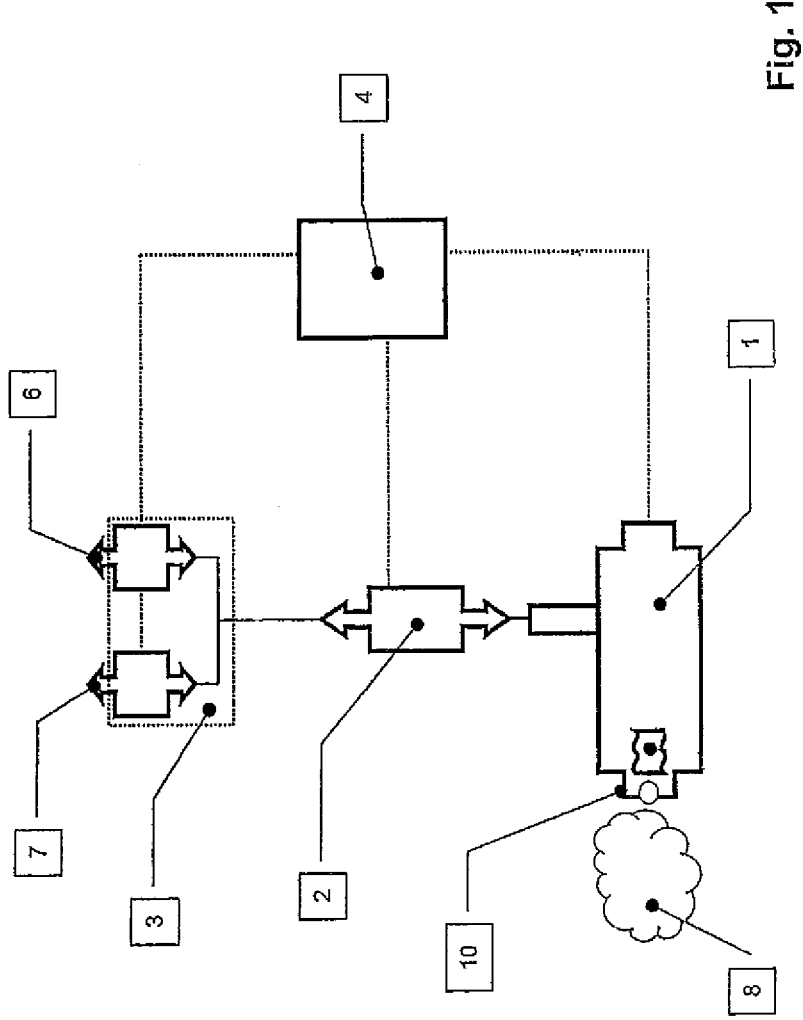
FIG. 1 shows the design of a system for introducing fuel into the exhaust line of a motor vehicle in a schematic sketch.

FIG. 1 shows the design of a system for introducing fuel into the exhaust line of a motor vehicle in a schematic sketch. The illustrated system substantially consists of a fuel evaporator 1, a metering pump 2, a 2-port/1-way valve 3 and a control unit 4. The 2-port/1-way valve 3 forms a branching, which encompasses a first branch comprising a fuel supply 6 and a second branch comprising an air supply 7, so that either fuel or air can be supplied to the inlet of the pump 2 and thus to the fuel evaporator 1.

In a first position of the 2-port/1-way valve 3, the pump 2 is connected to the fuel supply 6, so that fuel is supplied to the fuel evaporator 1 in response to the actuation of the pump 2. The fuel is evaporated in the fuel evaporator 1 and will be ejected as steam 8 into the gas line through an outlet 10.

In a second position of the 2-port/1-way valve, the metering pump 2 is connected to an air supply 7, so that air instead of fuel can be introduced into the fuel evaporator 1. In so doing, fuel residues in the fuel evaporator can be expelled and oil carbon can be combusted at the same time, so that a carbonization or sooting of the fuel evaporator can be counteracted.

The 2-port/1-way valve, the metering pump 2 and the fuel evaporator 1 can be controlled by means of a control unit 4, which can ensure a controlled supply of fuel to the fuel evaporator and for a cyclical air supply for the combustion of fuel residues.

Figure 2:
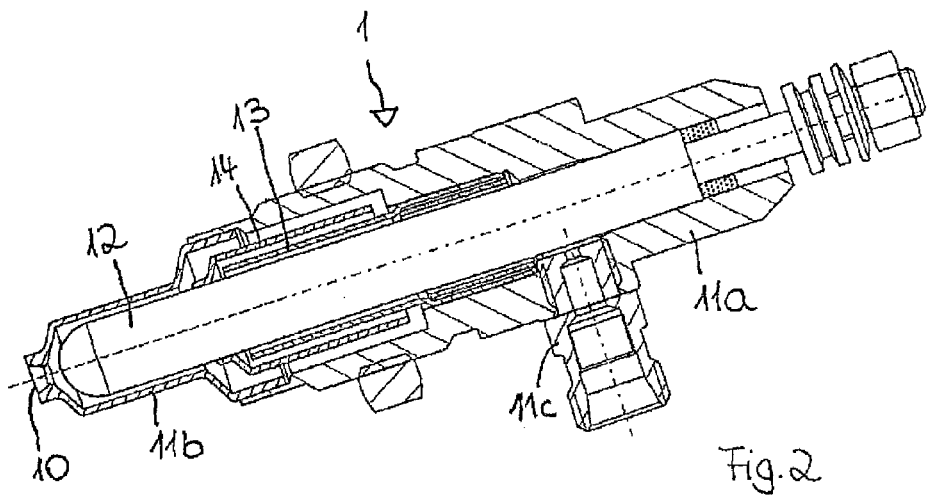
FIG. 2 shows an exemplary embodiment of a fuel evaporator in a longitudinal section.

FIG. 2 shows an exemplary embodiment of a fuel evaporator 1 in a longitudinal section. The fuel evaporator 1 has a multi-part housing 11a, 11b comprising a main housing part 11a, which surrounds a heating device 12, which is embodied in a rod-shaped manner, and comprising a housing end piece 11b, which encompasses an outlet 10 for evaporated fuel. The main housing part 11a is connected to a housing side part 11c, which encompasses an inlet for fuel to be evaporated. Preferably, the housing parts 11a, 11b, 11c are fitted together and are welded to one another. In particular the housing side part 11c, however, can also be screwed into the main part 11b.

In the illustrated exemplary embodiment, the housing end piece 11b has a smaller outer diameter than the main housing part 11a. The outer diameter of the housing end piece 11b thereby decreases gradually, namely in two stages, towards the outlet 10. The outlet 10 itself has an opening cross section, which widens towards the outside and is thus embodied as a diffuser. The opening cross section can widen in a cone-shaped manner, for example.

The heating device 12 is surrounded in the housing 11a, 11b by two engaging bushings 13, 14, which provide a meandering flow path between one another. One of the two bushings 13, in the illustrated exemplary embodiment the inner bushing, is connected to the housing 11a. The other bushing 14 is connected to the heating device 12 at its opposite end, thus advantageously resulting in an extended flow path for the fuel, which is to be evaporated.

Figure 3:
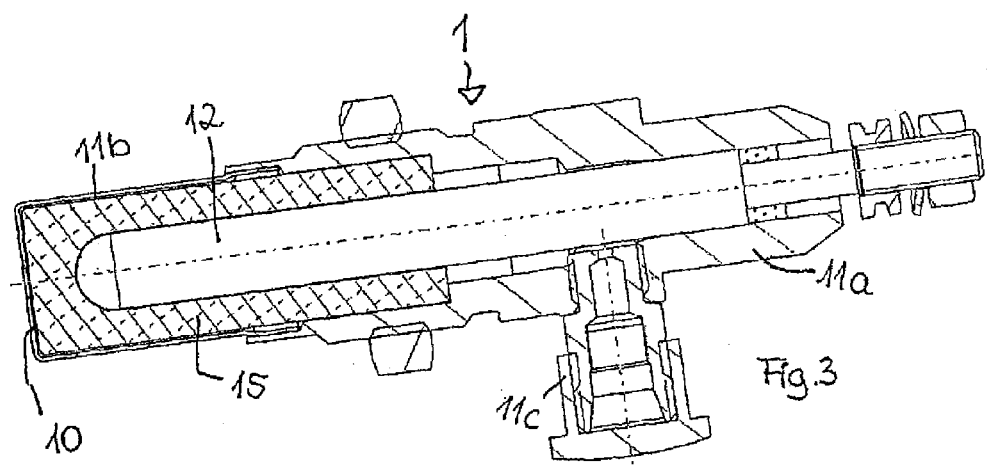
FIG. 3 shows a further exemplary embodiment of a fuel evaporator.

FIG. 3 shows a further exemplary embodiment of a fuel evaporator 1, which differs from the afore-described exemplary embodiment in the embodiment of the housing end piece 11b. In the case of this exemplary embodiment, the housing end piece 11b is formed cylindrically, thus has a substantially consistent outer diameter. A further difference to the afore-described exemplary embodiment is that the heating device 12 is surrounded by a screen 15, for example made of a metal braiding. This screen 15 together with the heating device 12 projects into the housing end piece 11b and causes an improved heat coupling of the fuel, which is to be evaporated, to the heating device 12.

Figure 4:
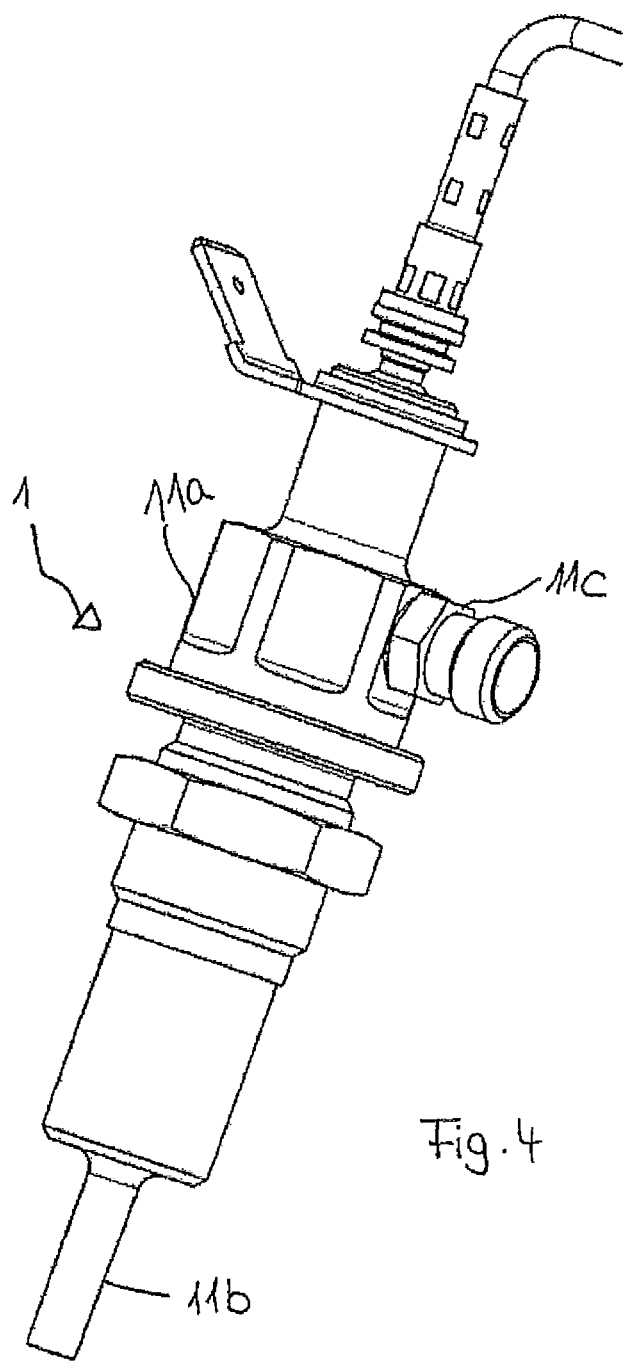
FIG. 4 shows a further exemplary embodiment of a fuel evaporator.
Figure 5:
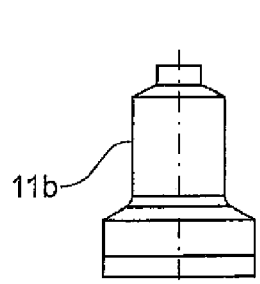
FIG. 5 shows the housing end piece of the exemplary embodiment shown in FIG. 2.
Figure 6:
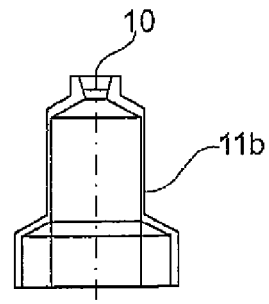
FIG. 6 shows a sectional view of FIG. 5.
Figure 7:
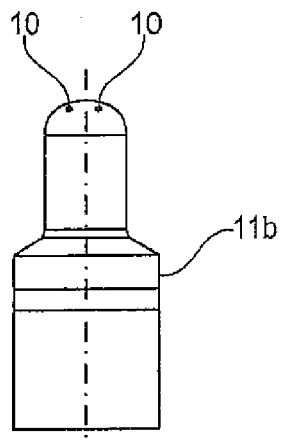
FIG. 7 shows the housing end piece of the exemplary embodiment shown in FIG. 4.
Figure 8:
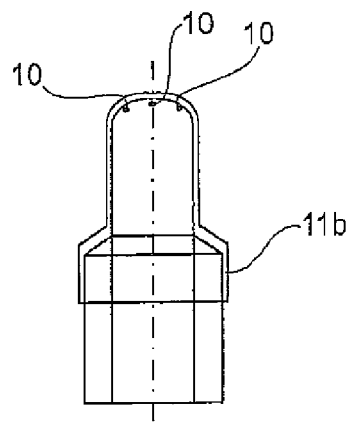
FIG. 8 shows a sectional view of FIG. 7.

A further exemplary embodiment of a fuel evaporator 1 is illustrated in FIG. 4. This exemplary embodiment differs from the exemplary embodiment illustrated in FIG. 2 only in the housing end piece 11b, which is shaped differently.

Different shapes of housing end pieces 11b are shown in FIGS. 5 to 10. The exemplary embodiment shown in FIGS. 5 and 6 has an expanding outlet opening 10, which is embodied as a diffuser and which thus effects a particularly fine distribution of escaping fuel vapor or mist. In the case of the exemplary embodiment illustrated in FIGS. 7 and 8, the outlet 10 of the housing end piece 11b is formed by means of a plurality of holes, which are arranged next to one another. These holes 10 form a hole rim and thus also cause a fine distribution of escaping fuel.

Figure 9:
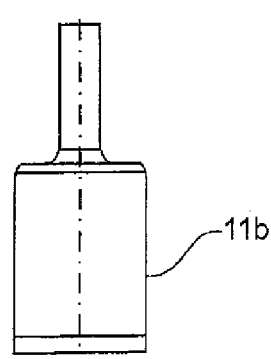
FIG. 9 shows a further exemplary embodiment of a housing end piece.
Figure 10:
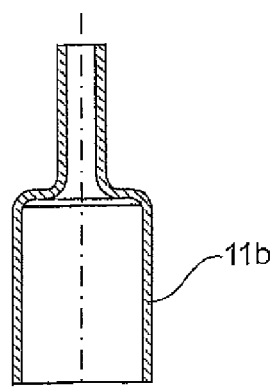
FIG. 10 shows a sectional view of FIG. 9.

A housing end piece, which is embodied in a particularly simple manner and in the case of which the outlet 10 is formed by means of the end of a cylindrical appendage, is illustrated in FIGS. 9 and 10.

Reference Numerals 1 fuel evaporator
2 metering pump
3 control valve
4 control unit
6 fuel supply
7 air supply
8 steam
10 outlet
11a main housing part
11b housing end piece
11c housing side part
12 heating device
13 bushing
14 bushing
15 screen

The invention claimed is:

1. A system for introducing fuel into the exhaust line of a motor vehicle, comprising
a fuel evaporator, which comprises a housing, which has an inlet and an outlet, and a heating device arranged in the housing, the outlet of the fuel evaporator connected to the exhaust line, and
a pump for pumping fuel into the fuel evaporator via the inlet,
wherein an inlet of the pump is connected to a branching, which comprises a first branch for supplying fuel and a second branch for supplying air.

2. The system according to claim 1, wherein the branching is a control valve by means of which either the first branch or the second branch can be blocked.

3. The system according to claim 1, wherein the fuel evaporator has a housing consisting of several parts, wherein a main housing part, which surrounds a heating device embodied in a rod-shaped manner, is joined with a housing end piece, which encompasses an outlet.

4. The system according to claim 3, wherein the main housing part is stuck together with the housing end piece.

5. The system according to claim 3, wherein the housing end piece is stuck into the main housing part.

6. The system according to claim 3, wherein the housing end piece has a smaller outer diameter than the main housing part.

7. The system according to claim 3, wherein the outer diameter of the housing end piece decreases towards the outlet.

8. The system according to claim 7, wherein the outer diameter of the housing end piece decreases gradually towards the outlet.

9. The system according to claim 3, wherein the heating device projects into the housing end piece.

10. The system according to claim 3, wherein the outlet is formed as a diffuser.

11. The system according to claim 3, wherein the outlet is embodied by means of a plurality of holes, which are arranged next to one another.

12. The system according to claim 11, wherein the outlet is embodied as a ring of holes.

13. The system according to claim 3, wherein the heating device is surrounded by a screen.

14. The system according to claim 13, wherein the screen projects into the housing end piece.

15. The system according to claim 3, wherein the heating device is surrounded by at least one bushing in the housing, said at least one bushing providing a flow path comprising two sections, which are arranged downstream from one another in flow direction, wherein one of the two sections leads along the interior of the bushing and the other section leads along the exterior of the bushing.

16. The system according to claim 15, wherein the tubular heating device is surrounded by at least two bushings in the housing, wherein one of the two bushings is fastened to the housing with one end and the other bushing is connected to the heating device with an opposite end, and wherein the two bushings engage with one another and form a section of the flow path between one another.

17. The system according to claim 15, wherein the at least one bushing is arranged in the main housing part.

* * * * *